US008554853B2

(12) United States Patent
Bostick et al.

(10) Patent No.: US 8,554,853 B2
(45) Date of Patent: Oct. 8, 2013

(54) HIDING EMAIL IDENTIFICATION USING A CONFIGURABLE SET OF DOMAINS

(75) Inventors: James E. Bostick, Cedar Park, TX (US); John M. Ganci, Jr., Cary, NC (US); John P. Kaemmerer, Pflugerville, TX (US); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 178 days.

(21) Appl. No.: 12/953,153

(22) Filed: Nov. 23, 2010

(65) Prior Publication Data

US 2012/0131109 A1    May 24, 2012

(51) Int. Cl.
  *G06F 15/16* (2006.01)
(52) U.S. Cl.
  USPC .......................................... 709/206
(58) Field of Classification Search
  USPC ...................... 709/206–207; 726/1
  See application file for complete search history.

(56) References Cited

U.S. PATENT DOCUMENTS

| 7,231,427 | B1 | 6/2007 | Du |
| 7,580,982 | B2 | 8/2009 | Owen et al. |
| 2002/0091940 | A1* | 7/2002 | Welborn et al. ............... 713/201 |
| 2005/0160292 | A1* | 7/2005 | Batthish et al. ............... 713/201 |
| 2005/0190765 | A1* | 9/2005 | Gotoh et al. ................... 370/390 |
| 2005/0204001 | A1* | 9/2005 | Stein et al. ..................... 709/206 |
| 2006/0026244 | A1* | 2/2006 | Watson .......................... 709/206 |
| 2006/0090080 | A1* | 4/2006 | Pearson et al. ................ 713/187 |
| 2007/0033258 | A1* | 2/2007 | Vasilaky et al. ............... 709/206 |
| 2008/0021962 | A1* | 1/2008 | Ryan et al. ..................... 709/206 |
| 2008/0133676 | A1* | 6/2008 | Choisser et al. .............. 709/206 |
| 2009/0094668 | A1* | 4/2009 | Corbin et al. ..................... 726/1 |
| 2009/0307317 | A1* | 12/2009 | Essenmacher et al. ....... 709/206 |
| 2011/0078260 | A1* | 3/2011 | Rashad et al. ................ 709/206 |
| 2011/0265016 | A1* | 10/2011 | Koopman ..................... 715/752 |

FOREIGN PATENT DOCUMENTS

| JP | 2002057692 A | 2/2002 |
| JP | 2007043614 A | 2/2007 |

OTHER PUBLICATIONS

Author: Marshall; Title: "User Guide MailMarshal Exchange 5.3"; Date: Nov. 2008; Publisher: Marshal Limited; Pertinent pp. 31-68.*
Katakis et al., "Email Mining: Emergencing Techniques for Email Management", Aristotle University of Thessaloniki, Dept. of Informaics, Greece, 2006, pp. 1-32.

(Continued)

*Primary Examiner* — Dustin Nguyen
*Assistant Examiner* — Hao Nguyen
(74) *Attorney, Agent, or Firm* — Yee & Associates, P.C.; John R. Pivnichny

(57) ABSTRACT

A method of delivering an electronic mail message. A mail server receives and stores a rule from a first user. Thereafter the mail server receives the electronic mail message from a second user comprising a sender. The mail server compares the rule with an email address in a field of the electronic mail message. Responsive to the rule being satisfied the email server takes an action with respect to the email address or the field to form a modified electronic mail message. Thereafter, the email server delivers the modified electronic mail message to a third user comprising a recipient. The first, second, and third users may all be different from each other.

23 Claims, 4 Drawing Sheets

(56) References Cited

OTHER PUBLICATIONS

"L-Soft Introductory list Owners Guide LISTSERV 1.8e", May 20, 2003, L-Soft International Inc., pp. 1-78.

Alexander, "Internet Traps, Rip-offs and Pitfalls and how to avoid them", pp. 1-51, retrieved Nov. 16, 2010 http://www.easy-earn.biz/itraps/book.php?book=itraps&f1=101&f2=netgen&send_pdf=yes.
Schuba, "Addressing Weaknesses in teh Domain name System Protocol", thesis—Purdue University, Aug. 1993, pp. 1-99.

* cited by examiner

HIDING EMAIL IDENTIFICATION USING A CONFIGURABLE SET OF DOMAINS

BACKGROUND

1. Field

The present invention relates to email, and more specifically to methods and devices for hiding email identifications outside of a configurable set of domains.

2. Description of the Related Art

Email is a ubiquitous method for transmitting electronic messages across a network, such as the Internet. Email is typically sent from sender at a client data processing system to a server computer. The server computer then sends the email to a recipient at another data processing system. The data processing system may be, for example, a desktop computer, a laptop computer, a mobile phone, or some other suitable type of device.

An email has two components. These components are a message header and a message body. The message header includes control information. This control information includes, for example, the sender's email address and one or more recipient addresses. The recipient addresses include one or more primary addresses. The control information also may include one or more carbon copy (CC) addresses, one or more blind carbon copy (BCC) addresses, or a combination of the two.

When email is sent, all email addresses in the list of carbon copy addresses as well as in the list of primary addresses are visible to all recipients of the email. Including a recipient's email address as a blind carbon copy prevents all other recipients from seeing that recipient's email address. Thus, when a sender wishes to avoid showing a particular recipient's email address to other recipients, the sender may designate that particular recipient's email address as a blind carbon copy. In this manner, a sender may selectively decide whether any given recipient knows who else received the email.

SUMMARY

According to one embodiment, a method of delivering an electronic mail message is presented. A mail server receives and stores a rule from a first user. Thereafter the mail server receives the electronic mail message from a second user comprising a sender. The mail server compares the rule with an email address in a field of the electronic mail message. Responsive to the rule being satisfied, the email server takes an action with respect to the email address or the field to form a modified electronic mail message. Thereafter, the email server delivers the modified electronic mail message to a third user comprising a recipient. The first, second, and third users may all be different from each other.

According to another embodiment, a computer program product for delivering an electronic mail message is provided. The computer program product includes a computer readable storage medium having computer readable program code embodied therewith. Computer readable program code is configured to receive and store, at a mail server, a rule from a first user. Computer readable program code is configured to thereafter receive the electronic mail message from a second user comprising a sender. Computer readable program code is configured to compare, at the mail server, the rule with an email address in a field of the electronic mail message. Computer readable program code is configured to, responsive to the rule being satisfied, take an action with respect to the email address or the field to form a modified electronic mail message. Computer readable program code is configured to thereafter deliver the modified electronic mail message to a third user comprising the recipient.

According to another embodiment, a data processing system is provided. The data processing system includes a bus, a processor connected to the bus, and a memory connected to the bus. The memory stores a computer program product for delivering an electronic mail message. The computer program product includes computer readable program code configured to receive and store, at a mail server, a rule from a first user. Computer readable program code is configured to thereafter receive the electronic mail message from a second user comprising a sender. Computer readable program code is configured to compare, at the mail server, the rule with an email address in a field of the electronic mail message. Computer readable program code is configured to, responsive to the rule being satisfied, take an action with respect to the email address or the field to form a modified electronic mail message. Computer readable program code is configured to thereafter deliver the modified electronic mail message to a third user comprising the recipient.

According to another embodiment, an email server is provided. The email server includes a bus, a processor connected to the bus, a communication mechanism, connected to the bus, configured to route email messages, and a memory connected to the bus. The memory stores a computer program product for delivering an electronic mail message. The computer program product includes computer readable program code configured to receive and store, at a mail server, a rule from a first user. Computer readable program code is configured to thereafter receive the electronic mail message from a second user comprising a sender. Computer readable program code is configured to compare, at the mail server, the rule with an email address in a field of the electronic mail message. Computer readable program code is configured to, responsive to the rule being satisfied, take an action with respect to the email address or the field to form a modified electronic mail message. Computer readable program code is configured to thereafter deliver the modified electronic mail message to a third user comprising the recipient.

BRIEF DESCRIPTION OF THE SEVERAL VIEWS OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
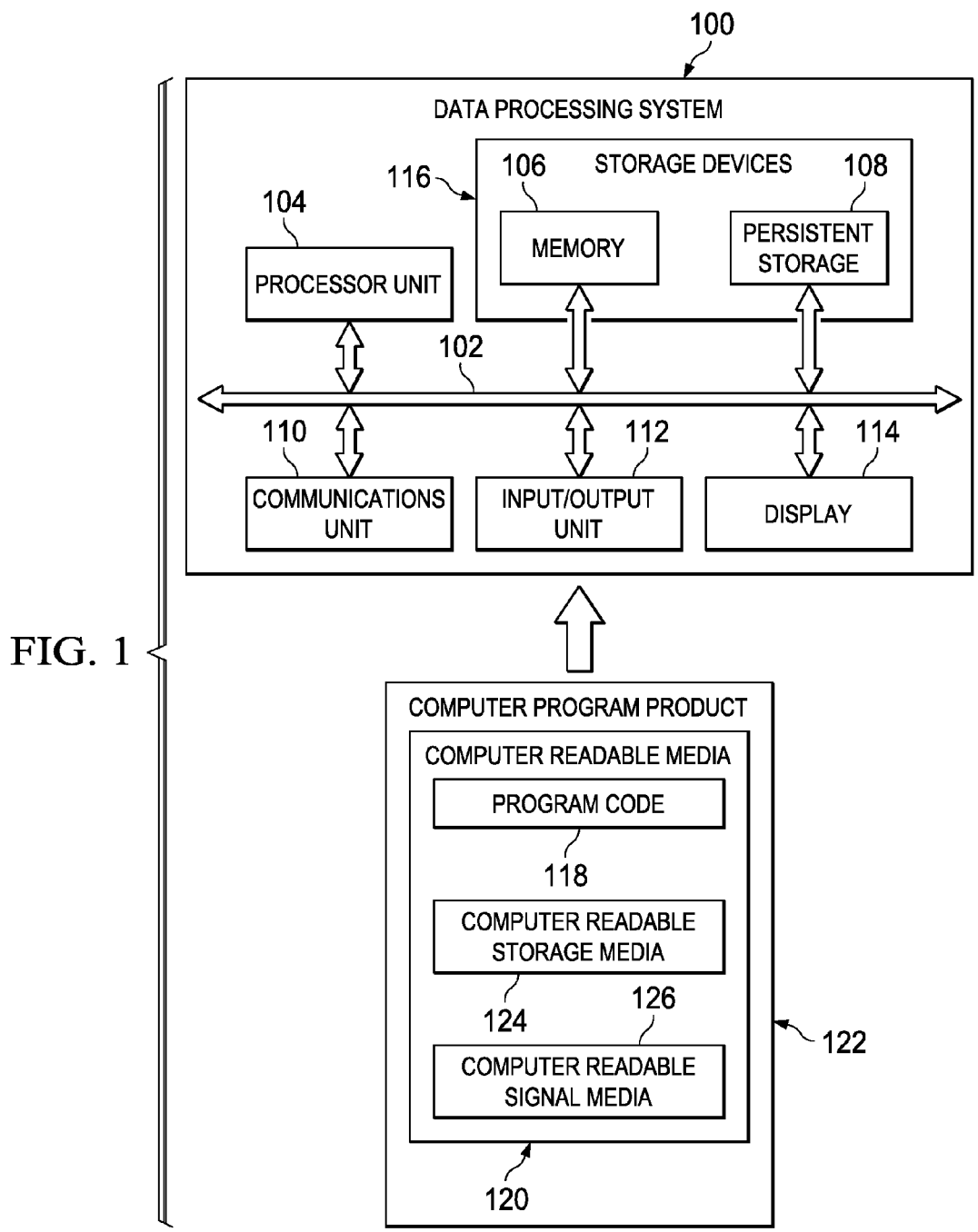
FIG. 1 is an illustration of a data processing system, in accordance with an advantageous embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The different illustrative embodiments recognize and take into account a number of considerations. For example, the different illustrative embodiments recognize and take into account that in some cases, the sender may desire that one or more recipients not know the entire list of addressees, despite the use of blind carbon copies for one or more email addresses. For example, the sender may desire that recipient A and recipient B do not know that the other recipient has received the email, but may desire that recipient C know that both recipients A and B received the email. This goal is not currently achievable using combinations of carbon copy and blind carbon copy designations in a single email.

Additionally, the different illustrative embodiments recognize and take into account that a sender may not desire to manually select email addresses to be in the blind carbon copy or the carbon copy lists. For long lists of recipients, selectively deciding which recipient is to be carbon copied and which recipient is to be blind carbon copied may use an undesirable amount of time.

Still further, the different illustrative embodiments recognize and take into account that the sender may desire that a first recipient receive only a first subset of the complete list of addressees, but a second recipient receive only a second, different subset of the complete list of addressees. The different illustrative embodiments recognize and take into account that this function is not currently possible using carbon copy and blind carbon copy designations. Accordingly, the different illustrative embodiments recognize and take into account it would be advantageous to have a method and apparatus, which takes into account one or more of the above issues as well as possibly other issues.

Turning now to FIG. 1, an illustration of a data processing system is depicted in accordance with an advantageous embodiment. In this illustrative example, data processing system 100 includes communications fabric 102, which provides communications between processor unit 104, memory 106, persistent storage 108, communications unit 110, input/output (I/O) unit 112, and display 114. Data processing system 100 may be used to implement the various embodiments described herein, such as for example those described with respect to FIGS. 2 through 4.

Processor unit 104 serves to execute instructions for software that may be loaded into memory 106. Processor unit 104 may be a number of processors, a multi-processor core, or some other type of processor, depending on the particular implementation. A number, as used herein with reference to an item, means one or more items. Further, processor unit 104 may be implemented using a number of heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example, without limitation, data, program code in functional form, and/or other suitable information either on a temporary basis and/or a permanent basis. Storage devices 116 may also be referred to as computer readable storage devices in these examples. Memory 106, in these examples, may be, for example, a random access memory or any other suitable volatile or non-volatile storage device. Persistent storage 108 may take various forms, depending on the particular implementation.

For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications, and/or programs may be located in storage devices 116, which are in communication with processor unit 104 through communications fabric 102. In these illustrative examples, the instructions are in a functional form on persistent storage 108. These instructions may be loaded into memory 106 for execution by processor unit 104. The processes of the different embodiments may be performed by processor unit 104 using computer implemented instructions, which may be located in a memory, such as memory 106.

These instructions are referred to as program code, computer usable program code, or computer readable program code that may be read and executed by a processor in processor unit 104. The program code in the different embodiments may be embodied on different physical or computer readable storage media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be computer readable storage media 124 or computer readable signal media 126. Computer readable storage media 124 may include, for example, an optical or magnetic disk that is inserted or placed into a drive or other device that is part of persistent storage 108 for transfer onto a storage device, such as a hard drive, that is part of persistent storage 108. Computer readable storage media 124 also may take the form of a persistent storage, such as a hard drive, a thumb drive, or a flash memory, that is connected to data processing system 100. In some instances, computer readable storage media 124 may not be removable from data processing system 100. In these examples computer readable storage media 124 is a physical or tangible storage device used to store program code 118 rather a medium that propagates or transmits program code 118. Computer readable storage media 124 is also referred to as a computer readable tangible storage device or a computer readable physical storage device. In other words, computer readable storage media 124 is a media that can be touched by a person.

Alternatively, program code 118 may be transferred to data processing system 100 using computer readable signal media 126. Computer readable signal media 126 may be, for example, a propagated data signal containing program code 118. For example, computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 118 may be downloaded over a network to persistent storage 108 from another device or data processing system through computer readable signal media 126 for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different advantageous embodiments may be implemented in a data processing system including components in addition to or in place of those illustrated for data processing system 100. Other components shown in FIG. 1 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 104 may take the form of a hardware unit that has circuits that are manufactured or configured for a particular use. This type of hardware may perform operations without needing program code to be loaded into a memory from a storage device to be configured to perform the operations.

For example, when processor unit 104 takes the form of a hardware unit, processor unit 104 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 118 may be omitted because the processes for the different embodiments are implemented in a hardware unit.

In still another illustrative example, processor unit 104 may be implemented using a combination of processors found in computers and hardware units. Processor unit 404 may have a number of hardware units and a number of processors that are configured to run program code 118. With this depicted example, some of the processes may be implemented in the number of hardware units, while other processes may be implemented in the number of processors.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of more devices that to transmit, data, receive data, or transmit and receive data. A communications unit may be, for example, a modem or a network adapter, two network adapters, or some combination thereof. Further, a memory may be, for example, memory 106, or a cache, such as found in an interface and memory controller hub that may be present in communications fabric 102.

Figure 2:
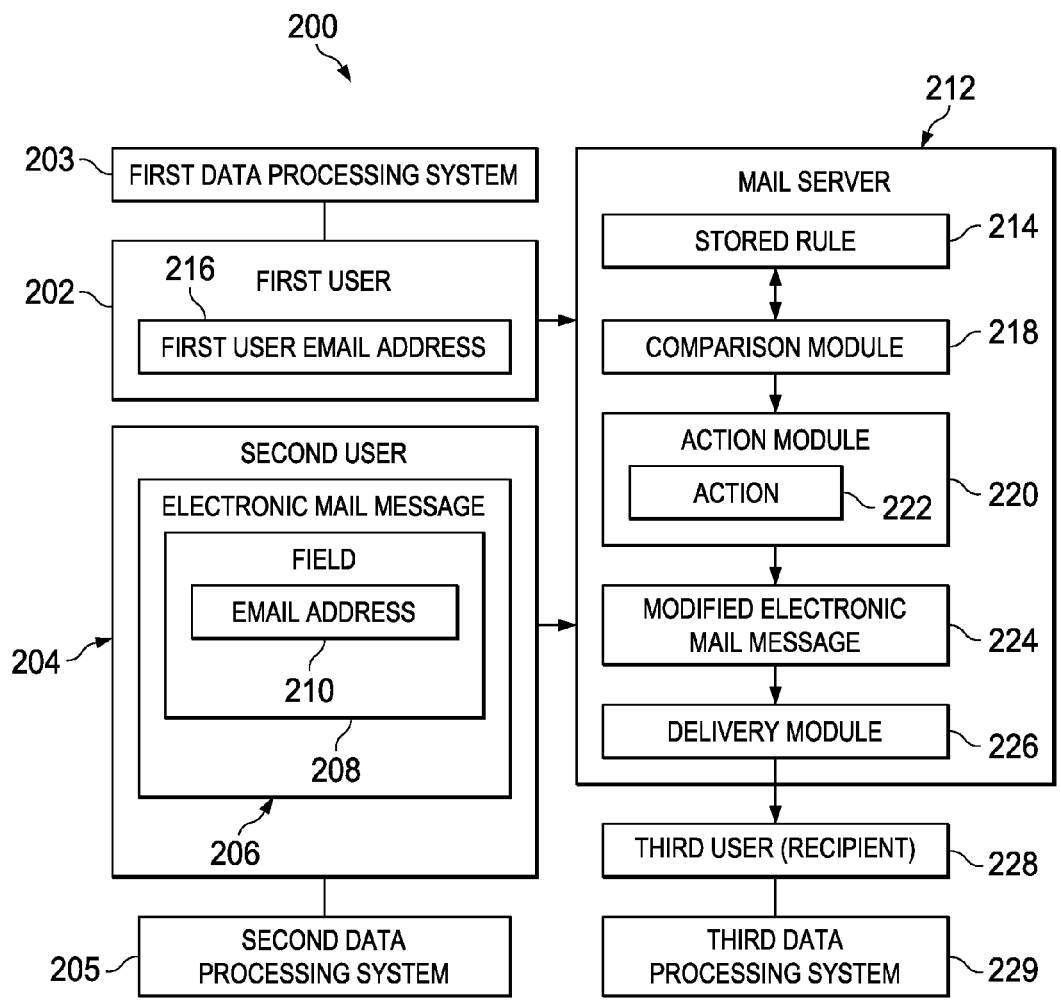
FIG. 2 is a block diagram of an electronic message delivery system, in accordance with an illustrative embodiment.

FIG. 2 is a block diagram of an electronic message delivery system, in accordance with an illustrative embodiment. The electronic message delivery system 200 shown in FIG. 2 may be used to implement the embodiments described herein. Electronic message delivery system 200 may be implemented using one or more data processing systems or servers, which in turn may take the form of data processing system 100 of FIG. 1. Similarly, electronic message delivery system 200 may be implemented using software, such as computer program product 122 of FIG. 1, which is stored on a computer readable media, such as computer readable media 120 of FIG. 1.

While electronic message delivery system 200 is described in the context of electronic mail routing, electronic message delivery system 200 is not limited to embodiments relating to electronic mail. For example, electronic message delivery system 200 might also be used for instant messaging, presence systems, and other types of message handling systems.

In an illustrative embodiment, a first user 202 is referred-to by second user 204 in an electronic mail message 206. First user 202 may use a first data processing system 203, or first user 202 may take the form of first data processing system 203. Second user 204 may use a second data processing system 205, or second user 204 may take the form of second data processing system 205. Either first data processing system 203 or second data processing system 205, or both, may take the form of data processing system 100 of FIG. 1. Thus, either first user 202 or second user 204 may be an actual user or may be an electronic device capable of sending electronic mail message 206. Additionally, first user 202 or second user 204 may be any data processing system, including a server, a hand held device, a phone, or any other device suitable for transmitting electronic messages such as electronic mail message 206. First data processing system 203 may or may not be the same as second data processing system 205.

Second user 204 may be referred to as a sender. First user 202 might or might not be a recipient of electronic mail message 206. First user 202 might or might not be aware that electronic mail message 206 is being sent. In many cases, first user 202 is different than second user 204 and first user 202 is not the sender of electronic mail message 206. However, second user 204 might be the same as first user 202 in some illustrative embodiments.

Electronic mail message 206 includes field 208. Field 208 includes email address 210, which may be for an intended recipient. Field 208 may be a number of different types, and may represent multiple fields. For example, field 208 may represent a primary address field, where primary email addresses are indicated. Field 208 may represent a carbon copy address field, where carbon copy email addresses are indicated. Field 208 may represent a blind carbon copy address field, where blind carbon copy email addresses are indicated. Field 208 may, in some illustrative embodiments, represent multiple fields. Thus, field 208 is not limited to one field and is not limited to any given type of field.

Field 208 may also be replaced, in different illustrative embodiments, with related objects. For example, field 208 might instead be a header of an instant message. Thus, field 208 is not limited to fields for indicating how email addresses are to be displayed to recipients, and in some illustrative embodiments may not be termed a "field" at all. Nevertheless, in a non-limiting illustrative embodiment, field 208 may be restricted to only a primary address field, a carbon copy field, and a blind carbon copy field.

Electronic mail message 206 is routed to mail server 212. Mail server 212 may take the form of a data processing system, such as data processing system 100 of FIG. 1. Mail server 212 may take the form of software, such as computer program product 122 of FIG. 1, stored on a computer readable storage media, such as computer readable storage media 120 of FIG. 1. Mail server 212 may take the form of a combination of hardware and software. Accordingly, the term "mail server," including mail server 212, contemplates any of hardware embodiments, software embodiments, or a combination of hardware and software embodiments.

Prior to routing electronic mail message 206 to mail server 212, the first user 202 transmits a set of rules rule to mail server 212, shown as stored rule 214. A set of rules may be one or more rules. However, in an embodiment, the rule is transmitted responsive to the transmission of electronic mail message 206. In still other embodiments, the rule may be transmitted contemporaneously with the transmission of electronic mail message 206 or even after the transmission of electronic mail message 206. However, at least in the latter case, electronic mail message 206 may be stored in mail server 212 until mail server 212 receives and can process the rule.

This rule is stored in mail server 212, and thus may be referred to as stored rule 214. Stored rule 214 may be any rule for determining how email addresses in electronic messages, such as email address 210 in electronic mail message 206, are to be displayed to recipients. Stored rule 214 may take the form of multiple rules, and thus is not limited to a single rule. Stored rule 214 may also represent one or more rules for determining how else mail server 212 is to route or otherwise handle or change electronic mail message 206. For example, stored rule 214 might be used to add text to a body of electronic mail message 206 or might be used to add, remove, or replace one or more email addresses to one or more fields of electronic mail message 206, or take any other action. In this manner, for example, stored rule 214 might cause electronic mail message 206 to be delivered to a recipient in addition to or instead of one or more intended recipients. Moreover, stored rule 214 might cause electronic mail message 206 to fail to be delivered to an intended recipient. Any change to electronic mail message 206 as a result of implementing stored rule 214 may or may not be made known to first user 202, second user 204, or the intended recipient. In these examples the intended recipient may be third user 228, as described below.

In an illustrative embodiment, stored rule 214 may specify which recipients can see email address 210 upon delivery. In a particular non-limiting illustrative embodiment, stored rule 214 may specify which recipients can see first user email address 216 in a carbon copy list of email addresses listed in field 208. Note that in this illustrative embodiment first user email address 216 would be included with email address 210 in field 208, possibly among other email addresses. Recall that in many cases first user 202 is not the sender of electronic mail message 206. Therefore, first user email address 216, now included in email address 210, may have been selected to be within field 208 without the knowledge of first user 202. However, stored rule 214, specified by first user 202, nevertheless may be used to modify how first user email address 216 is displayed to recipients.

Stored rule 214 may be based on several different operational principles. For example, stored rule 214 might be based on a domain of an email address. For example, stored rule 214 might be used to check for a domain name in email address 210. Upon satisfaction of stored rule 214, such as the domain name of email address 210 matching the domain name stored with stored rule 214, some action might be taken as described further below. Stored rule 214 may use any number of other operational principles. For example, stored rule 214 might be based on a precise email address, types of email addresses, subsets of a domain name or other aspects of email addresses, or any other desired operational principle. In another example of another operational principle, stored rule 214 might be based on one or more rules of exclusion. For example, stored rule 214 might specify that all recipients can see first user email address 216 when included in field 208, except for specified users. Those specified users might be based on a domain, such that any time first user email address 216 is included in a carbon copy field of field 208, all recipients except those having email addresses with domain names containing "CompanyA.com" or "OrganizationB.org" may see first user email address 216. In another example of a different operational principle, stored rule 214 might be based on one or more rules of inclusion. For example, stored rule 214 might specify that only certain users can see first user email address 216 when included in field 208. Those certain users might be based on a domain, such that for example only recipients with an address having a domain specifying "UniversityC.edu" can see first user email address 216 when included in field 208.

Stored rule 214 may be implemented by first user 202 using any of a number of techniques. For example, first user 202 might use a wizard or other application or plug-in relating to an electronic message interface. For example, a button might be presented on a bar, or a menu selection provided, to allow a user to enter rules information in one or more dialog boxes. The user may designate the rule and then transmit the rule to mail server 212 for storage as stored rule 214. In another illustrative embodiment, stored rule 214 may be automatically generated by either first user 202, mail server 212, or potentially any other user including second user 204 or the recipient, which may be third user 228, below. In still another illustrative embodiment, stored rule 214 may be specified by an owner or operator of mail server 212, or an owner or operator of an organization such as a company, or any other desired source.

Returning to the function of mail server 212, electronic mail message 206 is received at mail server 212 for processing. Before delivering electronic mail message 206, mail server 212 uses comparison module 218 to compare stored rule 214 to electronic mail message 206. Comparison module 218 may take many different forms, and may be implemented using hardware, software or both. Because comparison module 218 is part of mail server 212, mail server 212 may be characterized as performing the comparison.

A particular non-limiting illustrative embodiment, comparison module 218 may compare email address 210 in field 208 with stored rule 214. If stored rule 214 is satisfied during the comparison, then mail server 212 uses action module 220 to perform action 222. Like comparison module 218, action module 220 may take many different forms, and may be implemented using hardware, software or both. Because action module 220 is part of mail server 212, mail server 212 may be characterized as taking the comparison.

Action 222 could take many different forms. In an illustrative embodiment, action 222 may be to either remove or encrypt email address 210. In an illustrative embodiment, action 222 may be to switch fields, such that email address 210 is in a blind carbon copy field instead of a carbon copy field. More generally, action 222 may be to change fields so that the email address is in a second field of the electronic mail message, but not in the field. In another more general example, action 222 may be to cause the email address to be invisible to the recipient, wherein if action 222 were not taken the email address would be visible to the recipient. However, the opposite may occur. Thus, action 222 may be to cause the email address to be visible to the recipient, wherein if action 222 were not taken the email address would be invisible to the recipient. For example, the email address 210 may be switched from a blind carbon copy field to a carbon copy field. Still more generally, stored rule 214 may be one or more rules for controlling a set of other recipients that the recipient can see upon receipt of the electronic mail message. Thus, action 222 may be to implement this rule upon delivery of electronic mail message 206.

In a particular non-limiting illustrative embodiment, stored rule 214 is based on a domain of the email address. In this case, action 222 may be to cause the email address to be invisible to the recipient responsive to the domain being outside of an organization. For example, a third party in a company addresses electronic mail message 206 to a recipient and also places first user email address 216 in a carbon copy field of field 208, among many other email addresses in field 208. Some of those other email addresses in the carbon copy field are to users outside of the company. In this case, action module 220 of mail server 212 may selectively prevent all users outside of the domain name of the company from seeing first user email address 216. In this manner, those users outside of the company would be prevented from knowing that first user 202 had also received the email. The actual implementation of action 222 may take many different forms, as described above.

As a result of action 222, mail server 212 forms modified electronic mail message 224. Modified electronic mail message 224 has been modified according to stored rule 214. However, additional modifications may be made by mail server 212 to modified electronic mail message 224. For example, other policies or rules might be applied when modifying modified electronic mail message 224, such as but not limited to modifying the body of the electronic mail message, one or more fields of the electronic mail message, or even may specify how or when or to whom the electronic mail message is routed.

Thereafter, delivery module 226 may deliver modified electronic mail message 224 to third user 228. Delivery module 226 may take many different forms, and may be implemented using hardware, software or both. Because delivery module 226 is part of mail server 212, mail server 212 may be characterized performing the delivery. Third user 228 may be referred-to as a recipient.

Third user 228 may be an actual user or may be an electronic device capable of sending electronic mail message 206. Thus, third user 228 may be a third data processing system 229, which may be data processing system 100 of FIG. 1, a server, a hand held device, a phone, or any other device suitable for transmitting electronic messages such as modified electronic mail message 224. Third user 228 may include one or more different recipients, and thus is not limited to a single recipient. Third user 228 may or may not be the same as any of first user 203 or second user 205.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
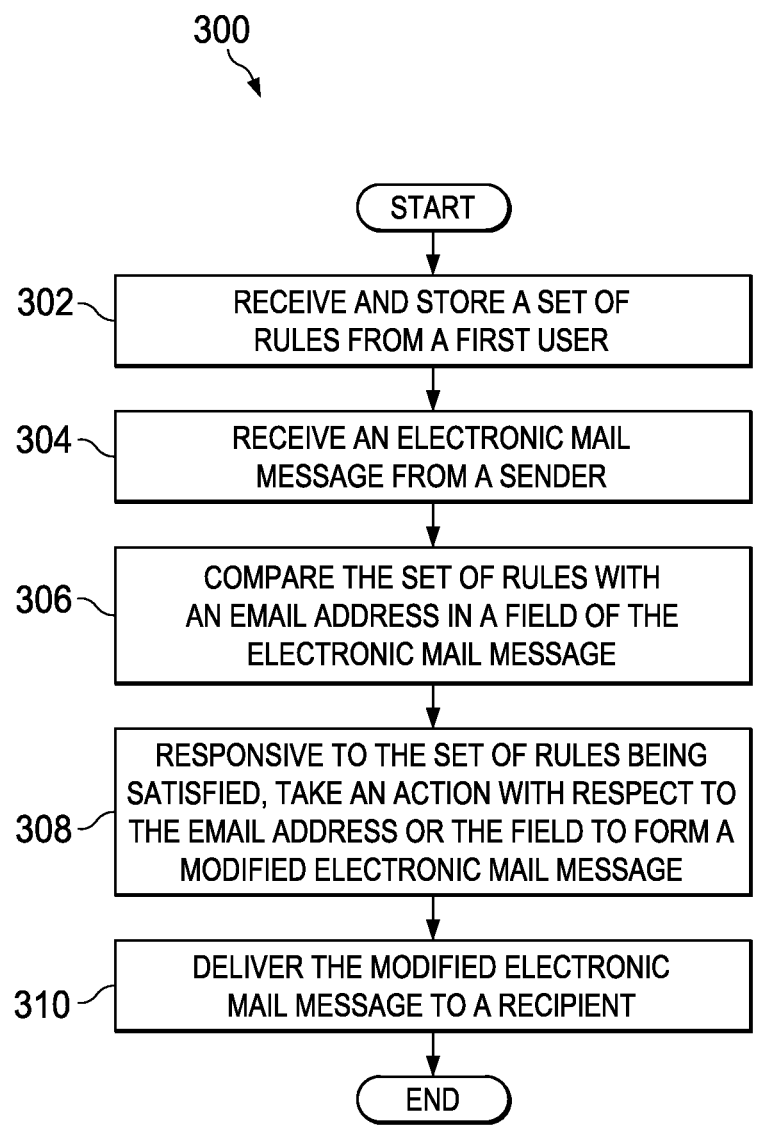
FIG. 3 is a flowchart of an electronic mail message delivery method, in accordance with an illustrative embodiment.

FIG. 3 is a flowchart of an electronic mail message delivery method, in accordance with an illustrative embodiment. Process 300 may be implemented in electronic message delivery system 200 of FIG. 2 or in data processing system 100 of FIG. 1. More generally, process 300 may be implemented by a processor of a data processing system, such as processor unit 104 of FIG. 1. In a particular embodiment, process 300 may be implemented in a mail server, such as mail server 212 of FIG. 2.

Process 300 may optionally begin by a mail server receiving and storing a set of rules from a first user (step 302). The set of rules may be one or more rules. Thereafter, or optionally at the beginning of process 300 if the set of rules are already stored, the mail server receives the electronic mail message from a sender (step 304). The mail server compares the set of rules with an email address in a field of the electronic mail message (step 306). Responsive to the set of rules being satisfied, the mail server takes an action with respect to the email address or the field to form a modified electronic mail message (step 308). The set of rules may be considered "satisfied" under different circumstances, as defined in the set of rules. For example, the set of rules may be considered "satisfied" if one rule in the set is satisfied, if a plurality of rules are satisfied, if all of the rules are satisfied, or any combination of individual rules is satisfied. Thereafter, the email server delivers the modified electronic mail message to a recipient (step 310). The process terminates thereafter.

Figure 4:
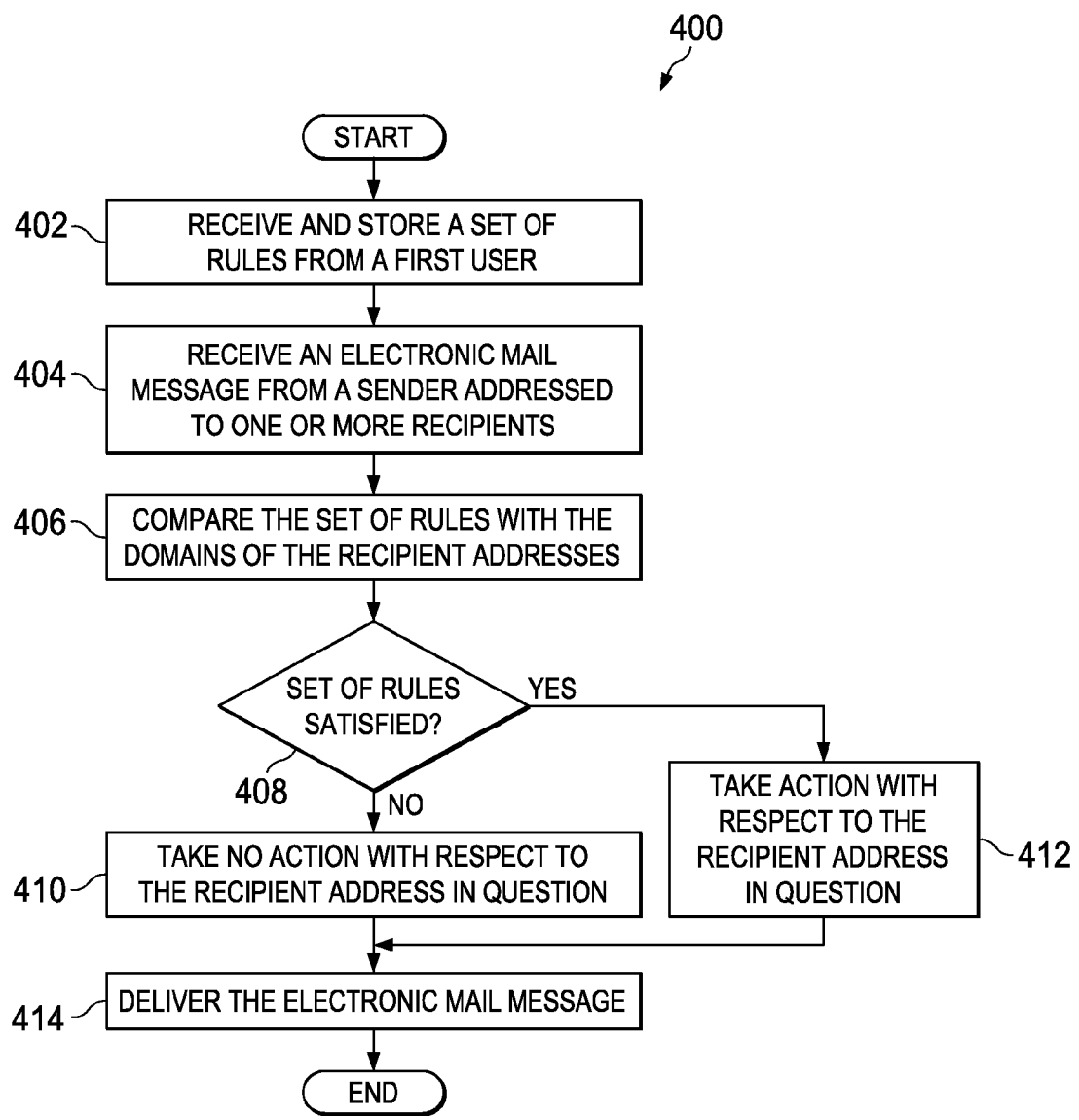
FIG. 4 is a flowchart of an electronic mail message delivery method, in accordance with an illustrative embodiment.

FIG. 4 is a flowchart of an electronic mail message delivery method, in accordance with an illustrative embodiment. Process 400 may be implemented in electronic message delivery system 200 of FIG. 2 or in data processing system 100 of FIG. 1. More generally, process 400 may be implemented by a processor of a data processing system, such as processor unit 104 of FIG. 1. In a particular embodiment, process 400 may be implemented in a mail server, such as mail server 212 of FIG. 2. Process 400 is a more specific, non-limiting embodiment of process 300 shown in FIG. 3.

Process 400 begins with a mail server receiving and storing a set of rules from a first user (step 402). The set of rules may be one or more rules, as described above. The first user may be a user using a data processing system, or may be a data processing system itself, as described above. In a non-limiting embodiment, the set of rules establish relate to handling of an electronic mail message based on a domain of an address of a recipient of an electronic mail message to be handled by the mail server.

The mail server then receives an electronic mail message from a sender addressed to one or more recipients (step 404). The sender may or may not be the first user, and the sender may or may not be aware that the first user has sent a rule to the mail server. The sender may be a user using a data processing system, or may be a data processing system itself, as described above. In this non-limiting embodiment, the electronic mail message may include a list of recipients having addresses comprising domains relating to the set of rules.

The mail server then compares the set of rules to the domains of the recipient addresses (step 406). In the embodiment of FIG. 4, the set of rules is compared on an individual basis with respect to each recipient addresses. The set of rules may comprise a rule that provides that recipient addresses having a particular domain should be excluded from being visible to all recipients, except to recipients sharing the same domain. For example, an individual sends an email having a return email address with a domain of "company X" to recipients both inside and outside of company X. The domains for recipients outside of company X will be different than "company X," and thus the rule will be triggered with respect to these external recipients.

The mail server then determines whether the set of rules have been satisfied (step 408). In the embodiment of FIG. 4, the set of rules is considered satisfied if a domain of a recipient address matches a domain to be excluded from being visible to individuals outside of that domain. Thus, for example, an email with a return address having a domain name of "company X" is sent to recipients having addresses of domain names "company X" and "company Y." The rule is satisfied with respect to the recipient address having the domain name "company X." Accordingly, the address having a domain name of "company X" may be made invisible to the recipient addressed to "company Y." Alternatively, this designation may be reversed. In yet another embodiment, the recipient with a domain name of "company Y" may be excluded from the list of recipients altogether, and thus might not ever receive the email. Again, the sender of the email may or may not be aware of the existence or application of the set of rules.

If the rule has not been satisfied with respect to a particular address, a "no" result at step 408, then no action is taken with respect to the recipient address in question (step 410). However, if the rule has been satisfied with respect to a particular address, a "yes" result at step 408, then action is taken with respect to the recipient address in question (step 412). As described above, this action may be to render invisible all email addresses having a particular domain name to organizations using a different domain name. However, this action may take many different forms and may refer to multiple actions, also as described above.

Whether or not the action is taken at either step 410 or step 412, the mail server then delivers the electronic mail message (step 414). The delivered electronic mail message may be either modified or unmodified, depending on whether an action was taken. The process terminates thereafter.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of delivering an electronic mail message, the method comprising:
    responsive to receiving, at a mail server comprising a processor unit, an electronic mail message from a sender, comparing, by the mail server, an email address in a field of the electronic mail message with a set of rules, wherein the set of rules specify what email addresses in the field are visible to a recipient of the email message based on at least one of a domain name, a precise email address, a type of email address, and a subset of a domain name;
    responsive to the rule being satisfied, taking an action with respect to the email address or the field to form a modified electronic mail message, wherein the action comprises causing the email address to be visible to the recipient, and wherein if the action were not taken the email address would be invisible to the recipient; and
    delivering the modified electronic mail message to the recipient.

2. The method of claim 1 further comprising:
    before receiving the electronic mail message, receiving and storing, at the mail server, the set of rules from a first user who is not the sender or the recipient.

3. The method of claim 1, wherein the action comprises changing fields so that the email address is in a second field of the modified electronic mail message, but not in the field.

4. The method of claim 3, wherein the second field comprises one of a carbon copy field and a blind carbon copy field, and wherein the field comprises the other of the carbon copy field and the blind carbon copy field.

5. The method of claim 1, wherein the field comprises only one of a primary email address recipient list, a carbon copy email address recipient list, and a blind carbon copy email address recipient list.

6. The method of claim 1, wherein the rule comprises one or more rules for controlling a set of other recipients that the recipient can see upon receipt of the modified electronic mail message.

7. The method of claim 6, wherein the rule is based on a domain of the email address.

8. The method of claim 7, wherein the action comprises causing the email address to be invisible to the recipient responsive to the domain being outside of an organization.

9. The method of claim 8, wherein the email address is an email address of the first user.

10. The method of claim 9, wherein the first, second, and third users are all different from each other.

11. The method of claim 1, wherein the rule comprises a rule of inclusion which will cause the email address to be visible to the recipient responsive to satisfaction of the rule.

12. The method of claim 1, wherein the rule comprises a rule of exclusion which will cause the email address to be invisible to the recipient responsive to satisfaction of the rule.

13. The method of claim 1 further comprising:
    delivering the modified electronic mail message to a plurality of additional recipients, and wherein the action comprises selecting ones of the plurality of additional recipients who are allowed to see the email address.

14. The method of claim 1 further comprising:
    delivering the modified electronic mail message to a plurality of additional recipients, and wherein the action comprises selecting ones of the plurality of additional recipients for whom the email address is either removed from the electronic mail message or made invisible in the electronic mail message.

15. A computer program product for delivering an electronic mail message, the computer program product comprising:
    a non-transitory computer readable storage medium having computer readable program code embodied therewith, the computer readable program code comprising:
    computer readable program code configured to receive and store, at a mail server, a rule from a first user, the rule specifies what email addresses are visible to a recipient of the electronic mail message based on at least one of a domain name, a precise email address, a type of email address, and a subset of a domain name;
    computer readable program code configured to thereafter receive, at the mail server, the electronic mail message from a second user comprising a sender;
    computer readable program code configured to compare, at the mail server, the rule with an email address in a field of the electronic mail message;
    computer readable program code configured to, responsive to the rule being satisfied, take an action with respect to the email address or the field to form a modified electronic mail message, wherein the action comprises causing the email address to be visible to the recipient, and wherein if the action were not taken the email address would be invisible to the recipient; and
    computer readable program code configured to thereafter deliver the modified electronic mail message to a third user comprising a recipient.

16. The computer program product of claim 15 further comprising:
    computer readable program code configured to deliver the modified electronic mail message to a plurality of additional recipients, and wherein the action comprises selecting ones of the plurality of additional recipients who are allowed to see the email address.

17. The computer program product of claim 15, wherein the rule comprises one or more rules for controlling a set of other recipients that the recipient can see upon receipt of the electronic mail message.

18. A data processing system comprising:
a bus;
a processor unit connected to the bus;
a memory connected to the bus, the memory storing a computer program product for delivering an electronic mail message, the computer program product comprising:
computer readable program code configured to receive and store a rule from a first user, the rule specifies what email addresses are visible to a recipient of the electronic mail message based on at least one of a domain name, a precise email address, a type of email address, and a subset of a domain name;
computer readable program code configured to thereafter receive the electronic mail message from a second user comprising a sender;
computer readable program code configured to compare the rule with an email address in a field of the electronic mail message;
computer readable program code configured to, responsive to the rule being satisfied, take an action with respect to the email address or the field to form a modified electronic mail message, wherein the action comprises causing the email address to be visible to the recipient, and wherein if the action were not taken the email address would be invisible to the recipient; and
computer readable program code configured to thereafter deliver the modified electronic mail message to a third user comprising a recipient.

19. The data processing system of claim 18, wherein the computer program product further comprises:
computer readable program code configured to deliver the modified electronic mail message to a plurality of additional recipients, and wherein the action comprises selecting ones of the plurality of additional recipients who are allowed to see the email address.

20. The data processing system of claim 18, wherein the rule comprises one or more rules for controlling a set of other recipients that the recipient can see upon receipt of the electronic mail message.

21. An email server comprising:
a bus;
a processor connected to the bus;
a communication mechanism, connected to the bus, configured to route email messages;
a memory connected to the bus, the memory storing a computer program product for delivering an electronic mail message, the computer program product comprising:
computer readable program code configured to receive and store a rule from a first user, the rule specifies what email addresses are visible to a recipient of the electronic mail message based on at least one of a domain name, a precise email address, a type of email address, and a subset of a domain name;
computer readable program code configured to thereafter receive the electronic mail message from a second user comprising a sender;
computer readable program code configured to compare the rule with an email address in a field of the electronic mail message;
computer readable program code configured to, responsive to the rule being satisfied, take an action with respect to the email address or the field to form a modified electronic mail message, wherein the action comprises causing the email address to be visible to the recipient, and wherein if the action were not taken the email address would be invisible to the recipient; and
computer readable program code configured to thereafter deliver the modified electronic mail message to a third user comprising a recipient.

22. The email server of claim 21, wherein the computer program product further comprises:
computer readable program code configured to deliver the modified electronic mail message to a plurality of additional recipients, and wherein the action comprises selecting ones of the plurality of additional recipients who are allowed to see the email address.

23. The email server of claim 21, wherein the rule comprises one or more rules for controlling a set of other recipients that the recipient can see upon receipt of the electronic mail message.

* * * * *